(12) United States Patent
Xu (10) Patent No.: US 11,429,488 B2
(45) Date of Patent: Aug. 30, 2022

(54) DATA RECOVERY METHOD BASED ON SNAPSHOTS, DEVICE AND STORAGE MEDIUM

(71) Applicant: TENCENT TECHNOLOGY (SHENZHEN) COMPANY LIMITED, Guangdong (CN)

(72) Inventor: Cheng Jie Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 300 days.

(21) Appl. No.: 16/025,427

(22) Filed: Jul. 2, 2018

(65) Prior Publication Data

US 2018/0307562 A1 Oct. 25, 2018

Related U.S. Application Data

(63) Continuation of application No. PCT/CN2017/103657, filed on Sep. 27, 2017.

(30) Foreign Application Priority Data

Oct. 14, 2016 (CN) .......................... 201610898471.8

(51) Int. Cl.
*G06F 11/14* (2006.01)
*G06F 16/11* (2019.01)
*G06F 8/30* (2018.01)

(52) U.S. Cl.
CPC ............ *G06F 11/1402* (2013.01); *G06F 8/30* (2013.01); *G06F 11/14* (2013.01); *G06F 16/128* (2019.01)

(58) Field of Classification Search
CPC .... G06F 16/128; G06F 11/1402; G06F 11/14; G06F 11/1448; G06F 11/1469; G06F 8/30; G06F 2201/84
See application file for complete search history.

(56) References Cited

U.S. PATENT DOCUMENTS

| 6,212,531 | B1 * | 4/2001 | Blea ................... G06F 11/1456 |
| 7,197,665 | B2 * | 3/2007 | Goldstein ............ G06F 11/1451 |
| | | | 714/15 |
| 7,523,277 | B1 * | 4/2009 | Kekre .................. G06F 11/1666 |
| | | | 711/162 |

(Continued)

FOREIGN PATENT DOCUMENTS

| CN | 101183387 A | 5/2008 |
| CN | 102591982 A | 7/2012 |

(Continued)

OTHER PUBLICATIONS

International Search Report for PCT/CN2017/103657 dated Dec. 6, 2017.

*Primary Examiner* — Neveen Abel Jalil
*Assistant Examiner* — Hubert Cheung
(74) *Attorney, Agent, or Firm* — Sughrue Mion, PLLC (57) ABSTRACT

A data recovery method and apparatus are provided. The method retrieving metadata according to a request for data recovery, where the metadata corresponds to a snapshot. A snapshot type of the snapshot is determined according to the metadata, and data recovery is performed according to the snapshot type, to generate recovered data. A false snapshot of the recovered data is generated, and metadata corresponding to the false snapshot is stored.

19 Claims, 9 Drawing Sheets

(56) References Cited

U.S. PATENT DOCUMENTS

| | | | |
|---|---|---|---|
| 7,680,836 B2* | 3/2010 | Anderson | G06F 16/174 707/999.202 |
| 7,999,810 B1* | 8/2011 | Boice | G06T 13/00 345/473 |
| 8,346,826 B2* | 1/2013 | Torii | G06F 12/00 707/831 |
| 8,364,920 B1* | 1/2013 | Parkison | G06F 11/1453 711/162 |
| 9,009,106 B1* | 4/2015 | Aron | G06F 3/065 707/610 |
| 9,927,980 B1* | 3/2018 | LeCrone | G06F 3/0683 |
| 10,146,634 B1* | 12/2018 | Bishop | G06F 11/1438 |
| 10,152,493 B1* | 12/2018 | Kirsch | G06F 16/184 |
| 10,409,691 B1* | 9/2019 | Patwardhan | G06F 11/1453 |
| 2002/0112113 A1* | 8/2002 | Karpoff | G06F 3/0665 711/4 |
| 2005/0015416 A1 | 1/2005 | Yamagami | |
| 2005/0028022 A1* | 2/2005 | Amano | G06F 11/1469 714/2 |
| 2006/0126608 A1* | 6/2006 | Pereira | H04L 41/0856 370/360 |
| 2008/0208927 A1* | 8/2008 | Chikusa | G06F 3/0643 |
| 2009/0144515 A1* | 6/2009 | Benari | G06F 11/1471 711/162 |
| 2009/0282101 A1* | 11/2009 | Lim | G06F 9/5077 718/1 |
| 2011/0184918 A1* | 7/2011 | Atluri | G06F 16/2358 707/684 |
| 2012/0124306 A1* | 5/2012 | Abercrombie | G06F 11/1451 711/162 |
| 2012/0159255 A1* | 6/2012 | Havewala | G06F 11/1435 714/37 |
| 2012/0179655 A1 | 7/2012 | Beatty et al. | |
| 2012/0254123 A1* | 10/2012 | Ferguson | G06F 16/128 707/649 |
| 2013/0159249 A1* | 6/2013 | Dewall | G06F 11/1662 707/610 |
| 2013/0219135 A1* | 8/2013 | Knowles | G06F 3/0673 711/159 |
| 2013/0263094 A1* | 10/2013 | Bates | G06F 11/3636 717/129 |
| 2014/0250075 A1* | 9/2014 | Broido | G06F 16/128 707/639 |
| 2015/0074054 A1* | 3/2015 | Antony | G06F 16/128 707/639 |
| 2015/0248421 A1 | 9/2015 | Hsiao et al. | |
| 2016/0019210 A1* | 1/2016 | O'Brian | G06F 16/176 707/747 |
| 2017/0052851 A1* | 2/2017 | Sudarsanam | G06F 11/1451 |
| 2017/0060473 A1* | 3/2017 | Fitzhardinge | G06F 16/9024 |
| 2017/0220777 A1* | 8/2017 | Wang | G06F 21/105 |
| 2017/0293628 A1* | 10/2017 | Adler | G06F 16/128 |
| 2018/0032404 A1* | 2/2018 | Komatsu | G06F 11/1448 |

FOREIGN PATENT DOCUMENTS

| | | |
|---|---|---|
| CN | 103268270 A | 8/2013 |
| CN | 103473277 A | 12/2013 |
| TW | 201535134 A | 9/2015 |

* cited by examiner

DATA RECOVERY METHOD BASED ON SNAPSHOTS, DEVICE AND STORAGE MEDIUM

CROSS-REFERENCE TO RELATED APPLICATION

This application is a continuation of International Patent Application No. PCT/CN2017/103657, filed on Sep. 27, 2017, which claims priority from Chinese Patent Application No. 201610898471.8, entitled "DATA RECOVERY METHOD AND DEVICE" filed on Oct. 14, 2016 in the Chinese Patent Office, the disclosures of which are incorporated by reference herein in their entirety.

BACKGROUND

1. Field

The present disclosure relates to the technical field of computer applications, and in particular to a data recovery method and device and a storage medium.

2. Description of Related Art

Along with constant development of information processing technologies, more and more data is stored. For ensuring security of data, the data is required to be backed up, and the data may further be recovered through the backup when necessary.

After data recovery is completed, a recovered state is stored to ensure executability of next recovery, otherwise a recovery problem caused by missing data state may occur when the data is continued to be operated on such a basis and recovered again.

SUMMARY

It is an aspect to provide a data recovery method and device and a storage medium that reduces storage costs and data recovery time, and in which stored data occupies a small storage space.

According to an aspect of one or more exemplary embodiments, there is provided a method. The method retrieving metadata according to a request for data recovery, where the metadata corresponds to a snapshot. A snapshot type of the snapshot is determined according to the metadata, and data recovery is performed according to the snapshot type, to generate recovered data. A false snapshot of the recovered data is generated, and metadata corresponding to the false snapshot is stored.

According to other aspects of one or more exemplary embodiments, there is also provided an apparatus and computer readable storage medium consistent with the method.

BRIEF DESCRIPTION OF THE DRAWINGS

Various exemplary embodiments will be described below with reference to the accompanying drawings, in which.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementation modes set forth in the following description of the exemplary embodiments do not represent all implementation modes consistent with the embodiments. Instead, they are merely examples of devices and methods consistent with some aspects of the embodiments as recited in the appended claims.

Figure 1:
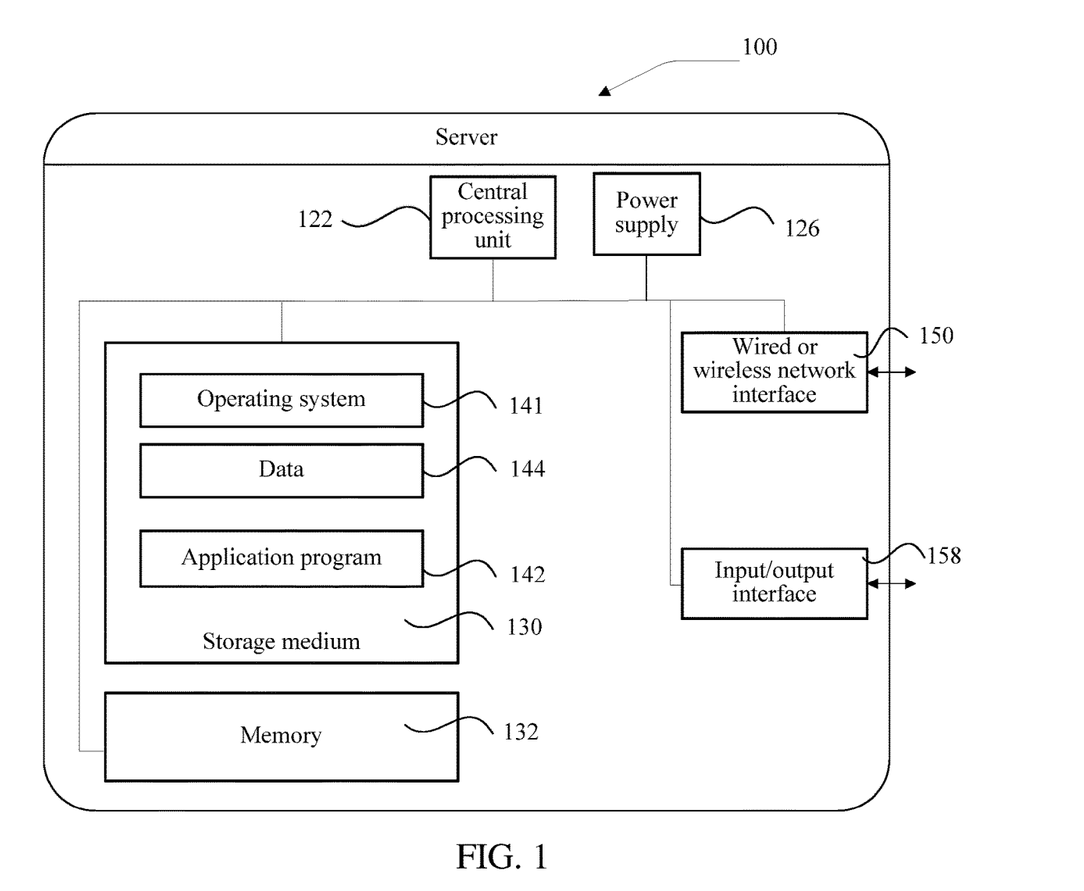
FIG. 1 is a block diagram of a device shown according to an exemplary embodiment.

FIG. 1 is a block diagram of a device 100 shown according to an exemplary embodiment. The device 100 may be a machine (or called as electronic equipment) installed with a database, for example, a server or terminal equipment realizing data storage function.

Referring to FIG. 1, the device 100 may have relatively great differences due to different configurations or performance, and may include one or more than one central processing unit (CPU) 122 (for example, one or more than one processor), a memory 132 and one or more than one storage medium 130 (for example, one or more than one piece of massive storage equipment) storing an application program 142 or data 144, wherein the memory 132 and the storage medium 130 may be configured for temporary storage or persistent storage. The program stored in the storage medium 130 may include one or more than one module (not shown in the figure), and each module may include a series of instruction operations in the device 100. Furthermore, the CPU 122 may be configured to communicate with the storage medium 130 to execute a series of instruction operations in the storage medium 130 on the device 100. The device 100 may further include one or more than one power supply 126, one or more than one wired or wireless network interface 150, one or more than one input/output interface 158 and/or one or more than one operating system 141, for example, Windows Server™, Mac OS X™, Unix™, Linux™ and FreeBSD™. Steps executed in the embodiments shown in FIG. 2, FIG. 3 and FIG. 4 may be based on the device structure shown in FIG. 1.

Figure 2:
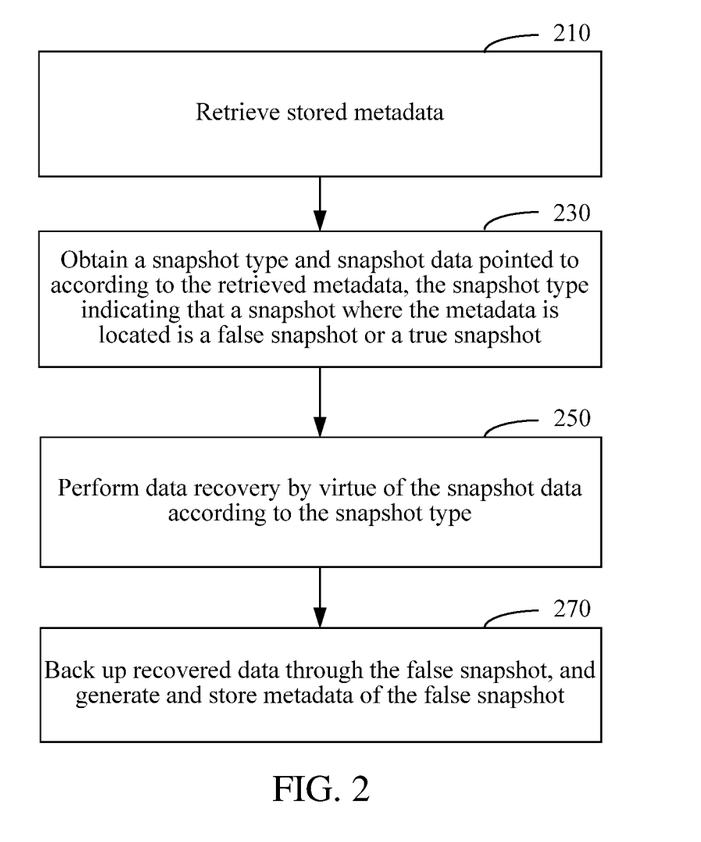
FIG. 2 is a flowchart of a data recovery method shown according to an exemplary embodiment.

FIG. 2 is a flowchart of a data recovery method shown according to an exemplary embodiment. The data recovery method may be executed by the device (for example, a server realizing data storage function) shown in FIG. 1 in an exemplary embodiment, and as shown in FIG. 2, may include the following steps:

Step 210: Retrieve stored metadata.

Recovery and backup of data refer to two different stages executed for the data, data backup may be performed when data recovery is completed, and the data may be recovered dependent on a backup obtained before when necessary. At present, data backup is not limited to a time point when data recovery is completed, and data backup may be performed at any time point when needed by a task.

Executed backup may be implemented in form of generating a snapshot. The snapshot obtained by backup includes a true snapshot and a false snapshot. The true snapshot includes metadata and snapshot data. The false snapshot only includes metadata to point to a true snapshot through the metadata, that is, the false snapshot depends on the true snapshot.

The metadata is used for implementing indexing of the snapshot data, and includes a snapshot generation timestamp, a snapshot type identifier, a path and a water range.

Along with execution of data backup, a snapshot is obtained by backup of each time, may be a true snapshot or a false snapshot, and is stored. Therefore, after backup is performed for many times, much metadata is stored for use for data recovery.

The stored metadata is retrieved according to data recovery initiated by a user, and retrieval of a snapshot is implemented by retrieval of the metadata, that is, the metadata is retrieved to determine the snapshot presently used for data recovery to further ensure that snapshot data may be accordingly obtained in a subsequent step.

In an exemplary embodiment, triggered data recovery may refer to a process of recovering data by virtue of a specified snapshot, and may also refer to a process of recovering the data to a specified time point. There are no limits made herein. However, the metadata is retrieved according to a corresponding data recovery requirement.

During specific implementation of an exemplary embodiment, step 210 may include: performing metadata retrieval in the stored metadata according to triggering of data recovery with a specified snapshot to obtain metadata of the specified snapshot. For example, when the user triggers an instruction of recovering data according to the specified snapshot, the device 100 may receive the corresponding instruction and then retrieve the stored metadata to obtain the metadata of the specified snapshot. That is, step 210 may also be expressed as "receive a user instruction of recovering data according to a specified snapshot, and retrieve stored metadata to obtain metadata of the specified snapshot according to the user instruction".

Metadata, as an index of a snapshot, may be used for identifying the snapshot. Therefore, when the snapshot is specified by the user for data recovery, the specified snapshot may be retrieved by virtue of the metadata.

Specifically, the metadata includes four identifiers. According to the above description, it can be known that the four identifiers included in the metadata are Timestamp, Flag, Path and WaterRange respectively, wherein Timestamp is a snapshot generation timestamp; Flag is a snapshot type identifier, and is used for indicating whether it is a true snapshot or not; Path is a storage path of the snapshot data; and WaterRange is the water range.

During specific implementation, the metadata of the snapshot may be described in the following form:

(Timestamp: ts, Flag: true, Path: snapshot_path, WaterRange: [ ]), wherein ts represents a specific timestamp, true represents that the snapshot type identifier indicates that it is a true snapshot, and snapshot_path represents a specific storage path of the snapshot data.

During specific implementation of another exemplary embodiment, step 210 may include: receiving a user instruction of recovering data to a specified time point, retrieving a snapshot generation timestamp of each piece of metadata in the stored metadata according to the user instruction, determining a snapshot generation timestamp closest to the specified time point before the specified time point, and determining metadata where the snapshot generation timestamp is to be retrieved metadata, namely determining metadata corresponding to the snapshot generation timestamp to be metadata corresponding to the snapshot required by data recovery.

The user may recover the data to any time point through the snapshot. During data recovery of each time at any time point, the time point is the specified time point.

In the stored metadata, each piece of metadata has a snapshot generation timestamp. Therefore, the specified time point is compared with the snapshot timestamp of each piece of metadata to determine a snapshot timestamp closest to the specified time point before the specified time point.

The snapshot used for recovering the data to the specified time point is further determined by virtue of the determined snapshot timestamp. That is, the metadata is retrieved, and the snapshot where the metadata is located is the snapshot used for recovering the data to the specified time point.

Specifically, the stored metadata is searched for metadata including a snapshot generation timestamp smaller than the specified time point T, namely Timestamp<T, and corresponding to a minimum value obtained by (T-Timestamp).

It can be understood that retrieval of the stored metadata in step 210 actually refers to retrieval of the metadata corresponding to the snapshot required by data recovery. The snapshot required by data recovery depends on the circumstance. For example, if the received instruction is to perform data recovery according to the specified snapshot, the snapshot required by data recovery is the specified snapshot. For another example, if the received instruction is to recover the data to the specified time point, the snapshot required by data recovery is the snapshot corresponding to the snapshot generation timestamp closest to the specified time point before the specified time point.

Step 230: Obtain a snapshot type and snapshot data pointed to according to the retrieved metadata, the snapshot type indicating that a snapshot where the metadata is located is a false snapshot or a true snapshot.

It can be understood that step 230 may also be expressed as "determine a snapshot type according to the retrieved metadata, and acquire the snapshot data pointed to by a path in the metadata". A person skilled in the art should know that a snapshot type includes a false snapshot and a true snapshot, and thus a meaning of the snapshot type may not be explained.

As described above, the metadata includes the snapshot type identifier and the path, so that the snapshot type and the snapshot data pointed tomay be obtained by virtue of the retrieved metadata.

The snapshot data is snapshot entity data. In a process of implementing data backup through a snapshot, a generated true snapshot includes snapshot entity data, while a false snapshot only includes metadata, and snapshot data used for data recovery is obtained through the true snapshot pointed to in the metadata.

According to different snapshot types, the snapshot data may be obtained through different processes, and then the obtained snapshot data may further be used for data recovery.

When the snapshot type indicates that the snapshot where the metadata is located is the true snapshot, the snapshot data in the true snapshot is directly acquired, that is, the snapshot data pointed to by the path in the metadata is directly acquired.

In an exemplary embodiment, when the snapshot type indicates that the snapshot where the metadata is located is the false snapshot, step 230 includes: extracting a snapshot type from the retrieved metadata, determining a true snapshot pointed to according to a false snapshot type indication of the snapshot type and the path in the metadata, and obtaining the snapshot data pointed to by virtue of the true snapshot. That is, the snapshot type is extracted from the metadata, and if the snapshot type indicates that the snapshot corresponding to the metadata is the false snapshot, the true snapshot pointed to by the path in the metadata is determined, and the snapshot data corresponding to the true snapshot is acquired.

The obtained snapshot data is a part of the true snapshot. Therefore, data recovery implemented by virtue of the false snapshot is implemented dependent on the true snapshot pointed to.

Step 250: Perform data recovery by virtue of the snapshot data according to the snapshot type.

It can be understood that step 250 may also be expressed as "perform data recovery through the snapshot data according to the snapshot type", which has a meaning consistent with the description, made in the above paragraph, about step 250.

It is important to note at first that a true snapshot is implemented by storing all data during executed data backup, so that snapshot data included therein is substantially total snapshot data. In other words, data may be recovered through the snapshot data of the true snapshot to data corresponding to a time point when the true snapshot is backed up.

A false snapshot depends on snapshot data of a true snapshot, and its backup time point is after a backup time point of the true snapshot. Therefore, data changes made between the backup time point of the true snapshot and the backup time point of the false snapshot will be stored through operations recorded in a water range in the metadata.

From the above, the water range in the metadata of the true snapshot is null; and operations are started to be recorded from the true snapshot in the water range in the metadata of the false snapshot, so that an operation sequence appended with timestamps is recorded in the water range in the metadata of the false snapshot.

During specific implementation of an exemplary embodiment, the operation sequence recorded in the water range in the metadata of the false snapshot is an operation binlog record in a time period from the backup time point of the true snapshot to the backup time point of the false snapshot.

When the snapshot where the retrieved metadata is is the false snapshot, similar to the true snapshot, the snapshot data is also loaded, and in addition, the water range is replayed for recovery into the data corresponding to the backup time point of the false snapshot on the basis of the true snapshot.

Step 270: Back up recovered data through the false snapshot, and generate and store metadata of the false snapshot.

It can be understood that a process of generating the metadata of the false snapshot is actually a process of generating the false snapshot, so that step 270 may also be described as "generate a false snapshot of recovered data, and storing metadata corresponding to the false snapshot".

After data recovery is completed through the true snapshot or the false snapshot and the true snapshot pointed to by the false snapshot, a data state when the true snapshot or the false snapshot is backed up is recovered, and at this time, the data state is required to be backed up to ensure smooth execution of a subsequent data recovery process.

The data state after data recovery is completed may be backed up in a manner of generating the false snapshot. On one hand, rapid backup of the data state after data recovery may be implemented. On the other hand, implementation of such false backup may greatly reduce storage cost, an extremely small storage space may be occupied, and since involved operations are only limited between the time points corresponding to the true snapshot and the false snapshot when data recovery is performed by virtue of the false snapshot, increase of operation time cost may be avoided.

Through the foregoing process, lightweight backup for the recovered data is implemented, and moreover, rapid recovery for any time point may be implemented through the operations recorded in the water range in the metadata.

Figure 3:
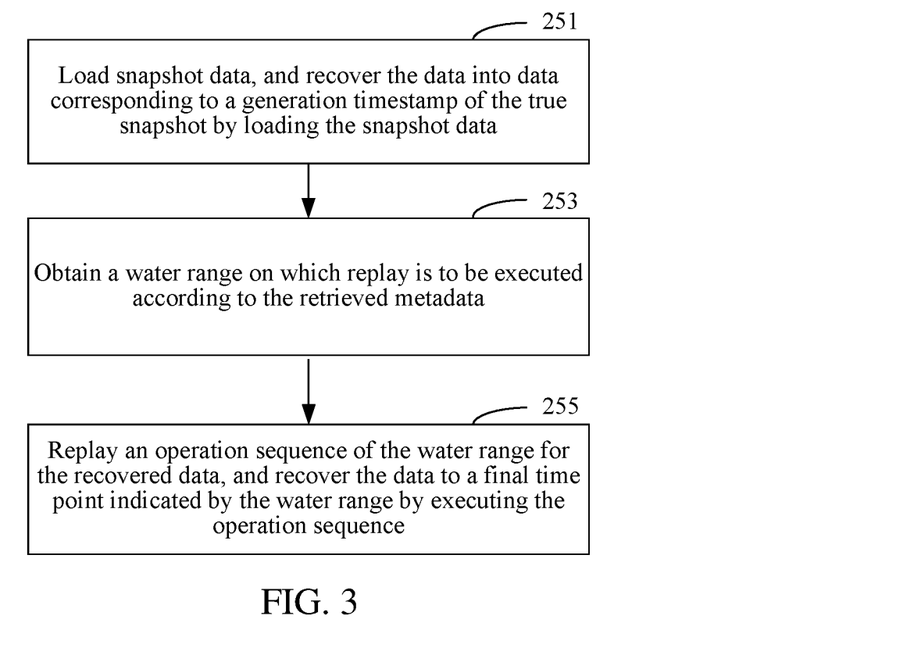
FIG. 3 is a flowchart describing details about a step of performing data recovery by virtue of snapshot data according to a snapshot data in the embodiment corresponding to FIG. 2.

FIG. 3 is a flowchart describing details about step 250 according to an exemplary embodiment. As shown in FIG. 3, step 250 may include the following steps.

It can be understood that, in the example, the snapshot type in the retrieved metadata indicates that the snapshot corresponding to the metadata is the false snapshot.

Step 251: Load the snapshot data, and recover the data to a moment corresponding to a generation timestamp of the true snapshot by loading the snapshot data.

When the snapshot type indicates that the snapshot where the metadata is located is the false snapshot, the snapshot data is loaded at first to recover the data into a data state corresponding to the true snapshot in this data recovery process.

Step 253: Obtain a water range on which replay is to be executed according to the retrieved metadata, namely determine the water range to be replayed according to the retrieved metadata.

As described above, the data changes made between the backup time point of the true snapshot and the backup time point of the false snapshot and even between the backup time point of the false snapshot and a specified time point are stored through the operations recorded in the water range. Therefore, when the snapshot type indicates that the snapshot where the metadata is located is the false snapshot, the water range in the metadata of the false snapshot will be replayed after data recovery is performed on the basis of the true snapshot.

For a data recovery process corresponding to the false snapshot, the water range in the retrieved metadata may directly be determined to be the water range on which replay is to be executed.

For a data recovery process corresponding to the specified time point, a water range between the backup time point of the false snapshot and the specified time point is further determined, it is a water range added on the basis of the water range in the metadata of the false snapshot, and the water range in the metadata of the false snapshot and the additional water range may further form the water range on which replay is to be executed.

That is, for the data recovery process corresponding to the specified time point, step 253 may specifically include: extracting a water range from the metadata; determining an additional time period according to a snapshot generation timestamp in the metadata and the specified time point, and determining an additional water range according to the additional time period; and enabling the extracted water range and the additional water range to form the water range on which replay is to be executed.

In an exemplary embodiment, the water range is substantially a segment of an operation binlog record specified by a time point. For example, the generated operation binlog record is a continuous and complete operation sequence with timestamps, and the water range points to a segment therein.

Step 255: Replay an operation sequence of the water range for the recovered data, and recover the data to a final time point indicated by the water range by executing the operation sequence.

It can be understood that the water range is replayed in a manner of executing the operation sequence and the data may be recovered to the final time point of the water range after replay is completed. Therefore, step 255 may also be described as "execute an operation sequence of the water range on data recovered after the snapshot data is loaded to replay the water range so as to recover the data to a final time point indicated by the water range."

After the water range on which the replay is executed is determined by the foregoing steps, the operation sequence in the water range may be executed, that is, the corresponding operations are replayed one by one according to a time sequence to finally implement data recovery.

For a data recovery process corresponding to the specified snapshot, the final time point corresponds to the snapshot generation timestamp in the metadata of the false snapshot.

For the data recovery process corresponding to the specified time point, the final time point is the specified time point.

By the foregoing process, specific implementation is provided for data recovery corresponding to the false snapshot, so that data recovery is accurately implemented through the false snapshot, not only is the storage cost reduced, but also data recovery speed and security are ensured under the action of the false snapshot.

Figure 4:
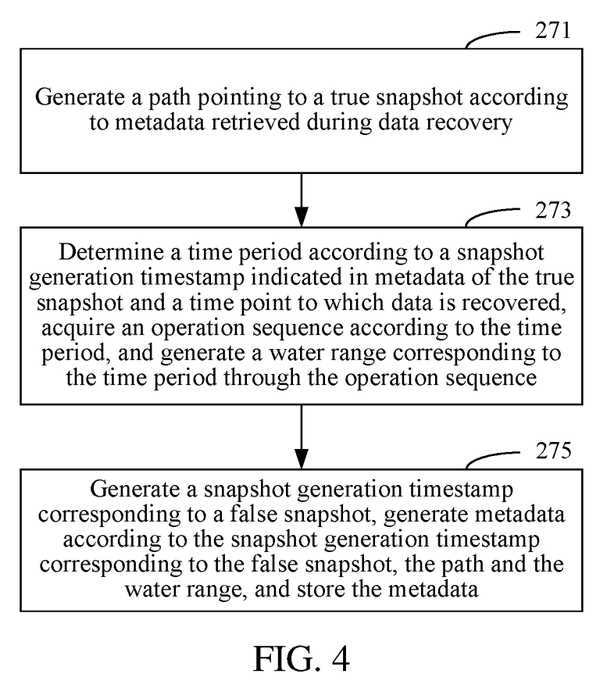
FIG. 4 is a flowchart describing details about a step of performing backup on recovered data through a false snapshot and generating and storing metadata of the false snapshot in the embodiment corresponding to FIG. 3.

FIG. 4 is a flowchart describing details about step 270 according to an exemplary embodiment. As shown in FIG. 4, step 270 may include the following steps.

Step 271: Generate a path pointing to a true snapshot according to metadata retrieved during data recovery. The true snapshot is a true snapshot on which the false snapshot to be generated depends, and the true snapshot on which the false snapshot to be generated depends may be a true snapshot pointed to by the path in the metadata retrieved in step 210, so that the path generated in step 271 may be the path in the metadata retrieved in step 210.

After data recovery is completed, for storing the present data state, backup may be performed to generate the false snapshot. As described above, the false snapshot has no entity data, that is, only the corresponding metadata is generated.

The generated false snapshot depends on a true snapshot, so that the path in the generated metadata points to the true snapshot.

Specifically, the generated path pointing to the true snapshot is the storage path of the snapshot data in the true snapshot.

Step 273: Determine a time period according to a snapshot generation timestamp indicated in the metadata of the true snapshot and a time point to which data is recovered, acquire an operation sequence according to the time period, and form a water range corresponding to the time period through the operation sequence.

As described above, a difference from the water range of the metadata of the true snapshot is that each operation with the timestamp, i.e. the operation sequence, is recorded in the water range of the metadata of the false snapshot. A time period corresponding to the operation sequence is a time period between the snapshot generation timestamp of the true snapshot and a present time.

Therefore, in a process of generating the metadata, an operation binlog record of the time period may be obtained through the binlog record of the operations according to the determined time period to further form the water range.

Step 275: Generate a snapshot generation timestamp corresponding to a false snapshot, generate metadata according to the snapshot generation timestamp corresponding to the false snapshot, the path and the water range, and store the metadata.

It can be understood that, in step 275, the snapshot generation timestamp corresponding to the false snapshot is actually a timestamp corresponding to a present moment, the path refers to the path generated in step 271 and the water range actually refers to the water range generated in step 273, so that step 275 may also be described as "generate a snapshot generation timestamp corresponding to the false snapshot, enable the snapshot generation timestamp, the path pointing to a true snapshot and the water range to form metadata corresponding to the false snapshot, and store the metadata corresponding to the false snapshot".

The snapshot generation timestamp corresponding to the false snapshot is generated according to the present time, and at this time, basic elements in the metadata are obtained, so that final metadata may be obtained and stored.

By the foregoing process, specific implementation is provided for false backup after data recovery, and the data state after recovery may further be prepared to be rapidly stored.

For data recovery implemented by the foregoing process, implementation of data backup after recovery may not bring additional snapshot data and a redundant water range, and the data may be repeatedly recovered to any moment, so that the storage cost is directly reduced, system interactions are reduced, time cost is further reduced correspondingly, and convenience for operation is improved.

Data recovery implemented by the foregoing process substantially provides an efficient snapshot management and recovery solution which may be applied to a database and may also be applied to another data system, and there are no limits made herein.

The data recovery method will be described in combination with a specific application scenario with a data recovery process in a database as an example.

It is important to note at first that massive data is stored in the database and, in a running process of the database, snapshots, i.e. true snapshots, may be periodically generated and an operation binlog of write operations is recorded.

In addition, during data recovery of each time performed in the database, false backup is performed on recovered data to correspondingly generate a false snapshot.

For the data backed up in the database, data at any time point may be defined as follows:

Data=snapshot+waterrange, where Data is obtained by data backup in the database, snapshot is a generated snapshot, and waterrange is a water range.

Figure 5:
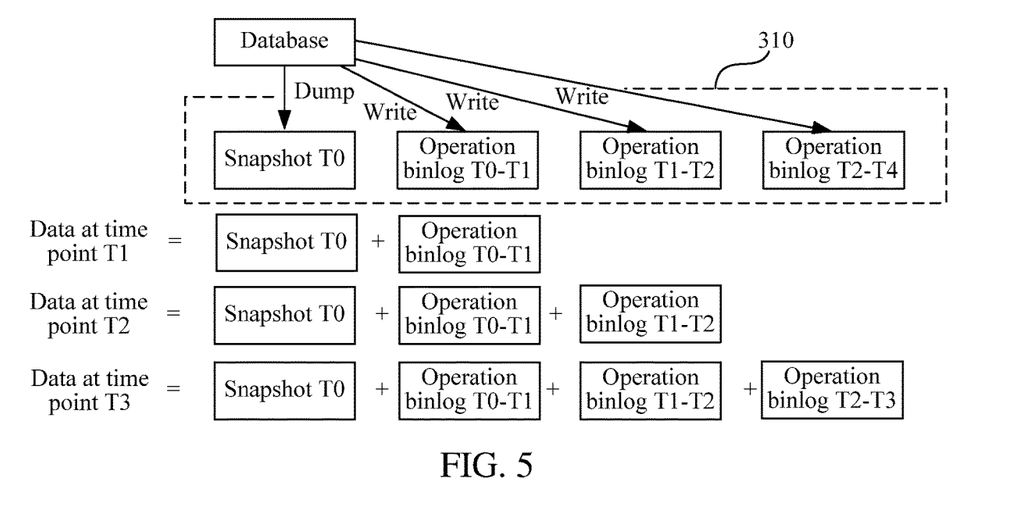
FIG. 5 is a structure diagram of data backed up at any time point according to an exemplary embodiment.

FIG. 5 is a structure diagram of data backed up at any time point according to an exemplary embodiment. For the data in the database, a snapshot is generated through a database dump command, and the snapshot may be a true snapshot and may also be a false snapshot.

As shown in FIG. 5, for the data in the database, for example, as shown in a selected part 310, a snapshot T0 is generated at a time point T0 through a database dump command, and the snapshot T0 is a true snapshot.

Then, every write operation over the data in the database may be recorded, that is, the write operation is recorded in an operation binlog.

As shown in the selected part 310, write operations executed in a time period T0-T1 is recorded in an operation binlog T0-T1; write operations executed in a time period T1-T2 are recorded in an operation binlog T1-T2; and write operations executed in a time period T2-T4 are recorded in an operation binlog T2-T4.

Therefore, it may be learned about, according to the data at any time point defined above, that data obtained by backing up the data of the database at a time point T1 includes the snapshot T0 and the operation binlog T0-T1, the operation binlog T0-T1 corresponds to a water range and a specific form is the data at the time point T1 shown in FIG. 5.

By parity of reasoning, data at another time point is also similar and will not be elaborated herein.

As described above, true snapshots generated by periodic data backup include snapshot data and water ranges are null; and on the basis of the true snapshots, false snapshots generated by false backup over recovered data only include metadata and water ranges of the metadata are non-null and namely point to operation binlogs between time points corresponding to the true snapshots and time points of present false backup, i.e., as shown for data at the time point T1, data at a time point T2 and data at a time point T3 in FIG. 5.

The data recovery process for the database will be described below in combination with the data shown in FIG. 5 in detail.

At first, true snapshots are periodically generated for the data in the database, which is implemented by executing the following two steps:

(1) Back up the data of the database to a file system through a database dump command, a path being snapshot_path and a timestamp being Now.

(2) Generate and store metadata of the true snapshots into a snapshot metadata database. At this time, the metadata is described as follows:

(Timestamp: ts, Flag: true, Path: snapshot_path, Water-Range: [ ]).

For the defined metadata, the foregoing description is implemented in, but not limited to, a manner of multiple tags. However, all fields may be sequentially stored, or a format such as eXtensible Markup Language (xml) and JavaScript Object Notation (json) is adopted for storage. Examples will not be listed one by one herein.

As described above, data recovery includes a process of data recovery with a specified snapshot and a process of recovering data to a specified time point.

The process of data recovery with the specified snapshot is implemented by executing the following steps:

(1) Retrieve the snapshot metadata database to find a specified snapshot, the snapshot being a true snapshot and its metadata being described as follows:

(Ttimestamp:ts,Flag:true,Path:snapshot_path,Water-Range:[ ]).

In the description about the metadata, it can be known from a snapshot type identifier Flag that the specified snapshot is a true snapshot, a snapshot generation time point is ts and a water range is null, and the data may be recovered to a data state at the time point ts through the snapshot.

For another example, the metadata of the found specified snapshot may also be described as follows:

(Timestamp:ts,Flag:false,Path:snapshot_path,Water-Range:[(t1,t2),(t3,t4) . . . (tx,ts)]).

In the description about the metadata, it can be known from the snapshot type identifier Flag that the specified snapshot is a false snapshot and the water range points to operation binlogs of time periods t1-t2, t3-t4, . . . , and tx-ts respectively.

(2) Load snapshot data pointed to by a path of the metadata in the snapshot.

At this time, for the true snapshot, its corresponding data recovery process implements data recovery and only false backup is performed; and for the data recovery process implemented by the false snapshot, the water range is also replayed to obtain the recovered data, that is, the following step (3) is executed.

(3) Replay the water range WaterRange:[(t1,t2), (t3,t4) . . . (tx,ts), namely execute a plurality of segments of binlogs of (t1,t2), (t3,t4), . . . , (tx,ts).

(4) Generate the false snapshot of the recovered database and store the obtained metadata into the snapshot metadata database. At this time, the metadata is described as follows:

(Timestamp:Now,Flag:false,Path:snapshot,WaterRange: [(t1,t2),(t3,t4) . . . (tx,ts)]).

The process of recovering the data to the specified time point T is implemented by executing the following steps:

(1) Retrieve the snapshot metadata database to find a snapshot for which Timestamp<T and which has a minimum value obtained by (T-Timestamp), the metadata of the snapshot being described as follows:

(Timestamp:ts,Flag:false,Path:snapshot_path,Water-Range:[(t1,t2),(t3,t4) . . . (tx,ts)]).

It may be determined according to "Flag:false" that the snapshot is a false snapshot.

(2) Load snapshot data pointed to by the metadata.

(3) Replay the water range, i.e. a plurality of segments of binlogs of (t1,t2), (t3,t4), . . . , (tx,ts).

(4) Replay a binlog of a time period (ts,T).

(5) Generate the false snapshot of the recovered database, i.e.:

(Timestamp:Now,Flag:false,Path:snapshot,WaterRange [(t1,t2),(t3,t4) . . . (tx,ts),(ts,T)]).

It is important to note herein that, in the foregoing description, the metadata is stored in, but not limited to, the metadata database, and storage of the metadata is not limited to the database manner. For example, a file storage manner may also be implemented, snapshot name+snapshot generation time is taken as a filename and a content is a content in the metadata.

The below is a device embodiment of the present disclosure, which may be configured to execute the foregoing data recovery method embodiment of the present disclosure.

Details undisclosed in the device embodiment of the present disclosure refer to the data recovery method embodiment of the present disclosure.

Figure 6:
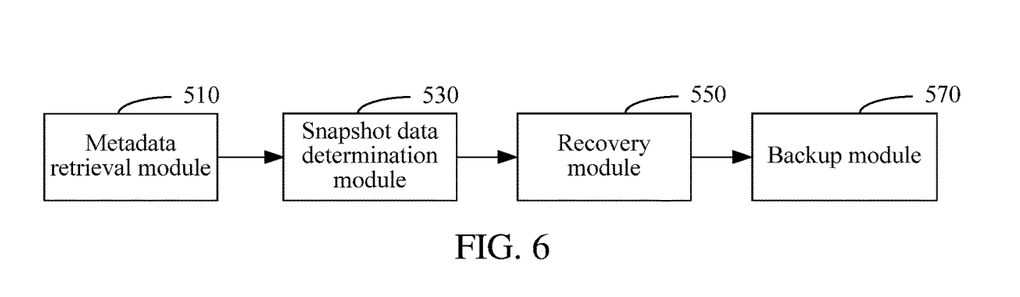
FIG. 6 is a block diagram of a data recovery device shown according to an exemplary embodiment.

FIG. 6 is a block diagram of a data recovery device shown according to an exemplary embodiment. The data recovery device may execute all the steps of the data recovery method shown in FIG. 2. As shown in FIG. 6, the data recovery device includes, but not limited to:

one or more than one memory; and
one or more than one processor, wherein
one or more than one instruction module is stored in the one or more than one memory, and is configured to be executed by the one or more than one processor, wherein
the one or more than one instruction module includes:
a metadata retrieval module 510, a snapshot data determination module 530, a recovery module 550 and a backup module 570.

The metadata retrieval module 510 is configured to retrieve stored metadata, namely to retrieve metadata corresponding to a snapshot indicated for data recovery.

The snapshot data determination module 530 is configured to obtain a snapshot type and snapshot data pointed to according to the retrieved metadata, the snapshot type indicating that a snapshot where the metadata is located is a false snapshot or a true snapshot, namely to determine a snapshot type according to the metadata and acquire snapshot pointed to by a path in the metadata.

The recovery module 550 is configured to perform data recovery through the snapshot data according to the snapshot type, namely to perform data recovery through the snapshot data according to the snapshot type.

The backup module 570 is configured to back up recovered data through a false snapshot to generate metadata of the false snapshot and store same, namely to generate a false snapshot of recovered data and store metadata corresponding to the false snapshot.

In an exemplary embodiment, the metadata retrieval module 530 is further configured to perform metadata retrieval in the stored metadata according to triggering of data recovery with a specified snapshot to obtain metadata of the specified snapshot. That is, the metadata retrieval module 530 receives a user instruction of recovering data according to the specified snapshot and retrieves the stored metadata to obtain the metadata of the specified snapshot according to the user instruction.

In another exemplary embodiment, the metadata retrieval module 530 is further configured to receive a user instruction of recovering data to a specified time point, retrieve a snapshot generation timestamp of each piece of metadata in the stored metadata according to the user instruction, determine a snapshot generation timestamp closest to the specified time point before the specified time point, and determine metadata where the snapshot generation timestamp is to be retrieved data (namely to determine metadata corresponding to the snapshot generation timestamp to be metadata corresponding to the snapshot indicated for data recovery).

In an exemplary embodiment, the snapshot type indicates that the snapshot where the metadata is located is afalse snapshot, the snapshot data determination module 530 is further configured to extract asnapshot type from the retrieved metadata, determine a true snapshot pointed to according to a false snapshot type indication of the snapshot type and the path in the metadata and obtain the snapshot data pointed to by virtue of the true snapshot. That is, the snapshot data determination module 530 specifically extracts asnapshot type from the metadata, and determines atrue snapshot pointed to by a path in the metadata and acquires snapshot data corresponding to the true snapshot if the snapshot type indicates that the snapshot corresponding to the metadata is a false snapshot.

Figure 7:
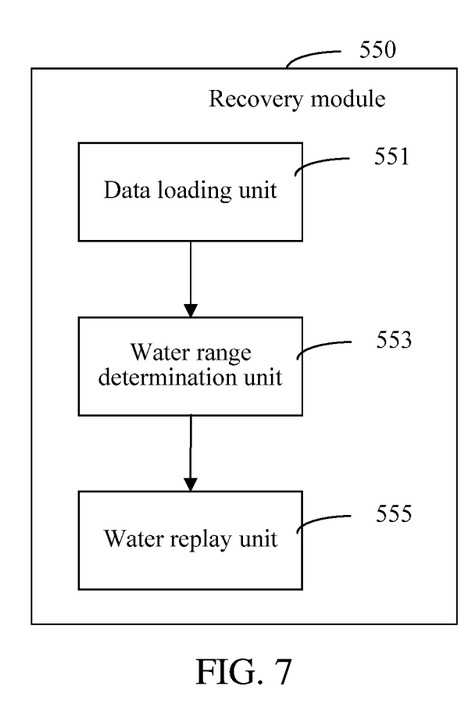
FIG. 7 is a block diagram describing details about a recovery module in the embodiment corresponding to FIG. 6.

FIG. 7 is a block diagram describing details about a recovery module according to an exemplary embodiment. The recovery module 550, as shown in FIG. 7, includes, but not limited to: a data loading unit 551, a water range determination unit 553 and a water replay unit 555.

The data loading unit 551 is configured to load snapshot data and recover the data into data corresponding to a generation timestamp of the true snapshot by loading the snapshot data, namely to recover data to a moment corresponding to a generation timestamp of the true snapshot by loading the snapshot data.

The water range determination unit 553 is configured to obtain a water range on which replay is to be executed according to the retrieved metadata, namely to determine the water range to be replayed according to the retrieved metadata.

The water replay unit 555 is configured to replay an operation sequence of the water range for the recovered data and recover the data to a final time point indicated by the water range by executing the operation sequence, namely to execute an operation sequence of the water range on data recovered after the snapshot data is loaded to replay the water range so as to recover the data to a final time point indicated by the water range.

Figure 8:
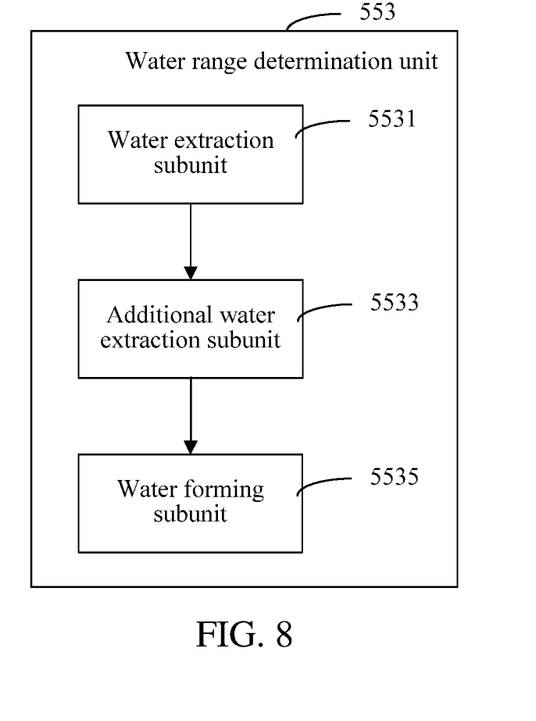
FIG. 8 is a block diagram describing details about a water range determination unit in the embodiment corresponding to FIG. 7.

FIG. 8 is a block diagram describing details about a water range determination unit according to an exemplary embodiment. The time point to which the data is recovered is a specified time point, and the water range determination unit 553, as shown in FIG. 8, includes, but not limited to: a water extraction subunit 5531, an additional water extraction subunit 5533 and a water forming subunit 5535.

The water extraction subunit 5531 is configured to extract awater range from the retrieved metadata.

The additional water extraction subunit 5533 is configured to determine an additional time period according to a snapshot generation timestamp indicated in the retrieved metadata and the specified time point and determine an additional water range according to the additional time period, namely to determine an additional time period according to a snapshot generation timestamp in the metadata and the specified time point and determining an additional water range according to the additional time period.

The water forming subunit 5535 is configured to enable the extracted water range and the additional water range to form the water range on which replay is to be executed.

Figure 9:
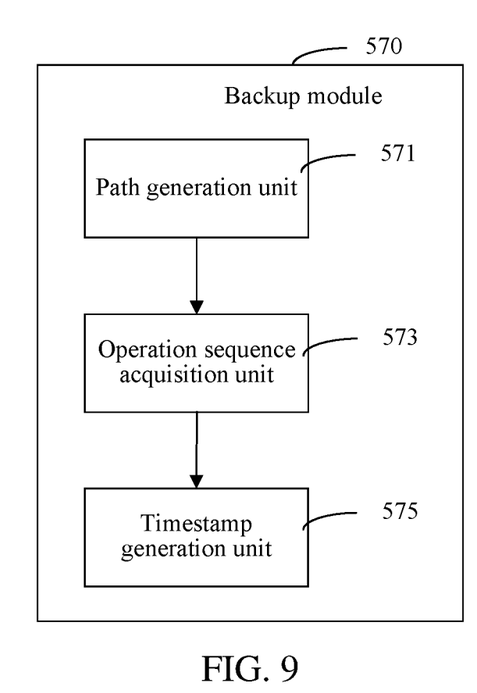
FIG. 9 is a block diagram describing details about a backup module in the embodiment corresponding to FIG. 6.

FIG. 9 is a block diagram describing details about a backup module according to an exemplary embodiment. The backup module 570, as shown in FIG. 9, includes, but not limited to: a path generation unit 571, an operation sequence acquisition unit 573 and a timestamp generation unit 575.

The path generation unit 571 is configured to generate a path pointing to a true snapshot according to the metadata retrieved during data recovery.

The operation sequence acquisition unit 573 is configured to determine a time period according to a snapshot generation timestamp indicated in the metadata of the true snapshot and a time point to which the data is recovered, acquire an operation sequence according to the time period and form a water range corresponding to the time period through the operation sequence.

The timestamp generation unit 575 is configured to generate a snapshot generation timestamp corresponding to the false snapshot, generate the metadata according to the snapshot generation timestamp corresponding to the false snapshot, the path and the water range and store the metadata, namely to generate a snapshot generation timestamp corresponding to the false snapshot, enable the snapshot generation timestamp, the path pointing to a true snapshot and the water range to form metadata corresponding to the false snapshot and store the metadata corresponding to the false snapshot.

In some examples, the present disclosure further provides a device, which may execute all or part of the steps of the data recovery method shown in any one of FIG. 2, FIG. 3 and FIG. 4. The device includes:

a processor (for example, a CPU 122 in FIG. 1); and a memory configured to store an instruction executable for the processor (for example, a memory 132 or storage medium 130 in FIG. 1), wherein the processor is configured to execute the following steps:

retrieving stored metadata;

obtaining a snapshot type and pointed snapshot data according to the retrieved metadata, the snapshot type indicating that a snapshot where the metadata is located is a false snapshot or a true snapshot;

performing data recovery by virtue of the snapshot data according to the snapshot type; and backing up recovered data through the false snapshot, and generating and storing metadata of the false snapshot.

Specific manners for operation execution of the processor of the device in the embodiment have been described in the embodiment about the data recovery method in detail and will not be elaborated herein.

In an exemplary embodiment, a storage medium is further provided, and the storage medium is a computer-readable storage medium which may be a transitory or non-transitory computer-readable storage medium including an instruction (for example, a nonvolatile computer-readable storage medium). The storage medium is, for example, a storage medium 130 in FIG. 1, and the instruction stored in the medium 130 may be executed (for example, executed by a CPU 122) to complete the data recovery method.

It can be understood that the instruction corresponding to the data recovery method may be stored in the memory and may also be stored in the storage medium. No matter whether it is stored in the storage medium or the memory, the instruction corresponding to the data recovery method may be executed to implement data recovery.

It should be understood that the embodiments of the present invention are not limited to exact structures that have been described above and are shown in the accompanying drawings, and various modifications and variations may be made without departing from the scope thereof. The scope of the embodiments of the present invention is only limited by the appended claims.

What is claimed is:

1. A method comprising:
retrieving, by at least one processor, metadata according to a request for data recovery, the metadata corresponding to a snapshot;
determining, by the at least one processor according to the metadata, a snapshot type of the snapshot from among a true snapshot type indicating a true snapshot that includes metadata and snapshot data and a false snapshot type indicating a false snapshot that only includes metadata and depends on the true snapshot;
performing, by the at least one processor, the data recovery according to the snapshot type, to generate recovered data;
after the data recovery is completed, generating a new false snapshot by:
generating a path pointing to immediately preceding true snapshot data stored prior to the data recovery, based on a path included in the retrieved metadata;
determining a time period from a snapshot generation timestamp included in the retrieved metadata and a time point at which the recovered data was recovered, acquiring an operation sequence of write operations performed during the time period, and forming a water range corresponding to the time period, the water range being based on the operation sequence;
generating a snapshot generation timestamp corresponding to the time point at which the recovered data was recovered; and
storing the new false snapshot comprising false snapshot metadata including the generated snapshot generation timestamp, the generated path and the formed water range; and
performing a backup subsequent to storing the new false snapshot, the backup referencing to the stored new false snapshot.

2. The method according to claim 1, wherein the request comprises a requested snapshot of a plurality of stored snapshots, and the metadata of the requested snapshot is retrieved.

3. The method according to claim 1, wherein the request comprises a time point, and the retrieving the metadata comprises:
retrieving the snapshot generation timestamp from metadata of each of a plurality of stored snapshots;
determining a closest snapshot generation timestamp that is closest in time to the time point and that is before the time point, and
determining metadata corresponding to the closest snapshot generation timestamp.

4. The method according to claim 1, wherein: when the snapshot type is the true snapshot type, the recovered data is directly acquired from the path included in the retrieved metadata, and
when the snapshot type is the false snapshot type, initial true snapshot data is acquired from the path included in the retrieved metadata, and the recovered data is generated by replaying, on the initial true snapshot data, the operation sequence indicated by range information in the retrieved metadata.

5. The method according to claim 4, wherein replaying the operation sequence comprises:
determining a range to be replayed according to the range information included in the metadata; and
executing an operation sequence of operations indicated by the range on the initial true snapshot data to generate the recovered data to a final time point indicated by the range.

6. The method according to claim 5, wherein the request comprises a time point, and determining the range to be replayed comprises:
extracting the range from the metadata;
determining an additional time period according to the snapshot generation timestamp in the metadata and the time point, and determining an additional range according to the additional time period; and
enabling the extracted range and the additional range to form the range on which replay is to be executed.

7. The method according to claim 1, wherein the metadata includes information for indexing of snapshot data of the snapshot.

8. The method according to claim 7, wherein the information comprises a snapshot generation timestamp, a snapshot type identifier, a path to the snapshot data, and a water range corresponding to the snapshot data.

9. An apparatus comprising:
at least one memory configured to store computer program code; and
at least one processor configured to access the at least one memory and operate according to the computer program code, the computer program code including:
retrieving code configured to cause at least one of the at least one processor to retrieve metadata according to a request for data recovery, the metadata corresponding to a snapshot;
determining code configured to cause at least one of the at least one processor to determine, according to the retrieved metadata, a snapshot type of the snapshot from among a true snapshot type indicating a true snapshot that includes metadata and snapshot data and a false snapshot type indicating a false snapshot that only includes metadata and depends on the true snapshot;
performing code configured to cause at least one of the at least one processor to perform the data recovery according to the snapshot type, to generate recovered data;
generating code configured to cause at least one of the at least one processor to, after the data recovery is completed, generate a new false snapshot by:
generating a path pointing to immediately preceding true snapshot data stored prior to the data recovery, based on a path included in the retrieved metadata;
determining a time period from a snapshot generation timestamp included in the retrieved metadata and a time point at which the recovered data was recovered, acquire an operation sequence of write operations performed during the time period, and form a water range corresponding to the time period, the water range being based on the operation sequence;
generating a snapshot generation timestamp corresponding to the time point at which the recovered data was recovered; and
storing the new false snapshot comprising false snapshot metadata including the generated snapshot generation timestamp, the generated path and the formed water range; and
backup code configured to cause at least one of the at least one processor to, perform a backup subsequent to storing the new false snapshot, the backup referencing to the new false snapshot.

10. The apparatus according to claim 9, wherein the request comprises a requested snapshot of a plurality of stored snapshots, and the metadata of the requested snapshot is retrieved.

11. The apparatus according to claim 9, wherein the request comprises a time point, and the retrieving code comprises:
retrieving subcode configured to cause at least one of the at least one processor to retrieve the snapshot generation timestamp from metadata of each of a plurality of stored snapshots;
determining subcode configured to cause at least one of the at least one processor to determine a closest snapshot generation timestamp that is closest in time to the time point and that is before the time point, and metadata determining code configured to cause at least one of the at least one processor to determine metadata corresponding to the closest snapshot generation timestamp.

12. The apparatus according to claim 9, wherein:
when the snapshot type is the true snapshot type, the performing code is configured to cause at least one of the at least one processor to generate the recovered data by directly acquiring the snapshot data from the path included in the retrieved metadata, and
when the snapshot type is the false snapshot type, the performing code is configured to cause at least one of the at least one processor to generate the recovered data by acquiring initial true snapshot data from the path included in the retrieved metadata, and generate the recovered data by replaying, on the initial true snapshot data, the operation sequence indicated by range information in the retrieved metadata.

13. The apparatus according to claim 12, wherein replaying the operation sequence comprises:
determining a range to be replayed according to the range information included in the metadata; and
executing an operation sequence of operations indicated by the range on the initial true snapshot data to generate the recovered data to a final time point indicated by the range.

14. The apparatus according to claim 13, wherein the request comprises a time point, and determining the range to be replayed comprises:
extracting the range from the metadata;
determining an additional time period according to the snapshot generation timestamp in the metadata and the time point, and determining an additional range according to the additional time period; and
enabling the extracted range and the additional range to form the range on which replay is to be executed.

15. A non-transitory computer readable storage medium storing computer program code which, when executed by at least one processor, causes the at least one processor to perform operations comprising:
retrieving metadata according to a request for data recovery, the metadata corresponding to a snapshot;
determining, according to the retrieved metadata, a snapshot type of the snapshot from among a true snapshot type indicating a true snapshot that includes metadata and snapshot data and a false snapshot type indicating a false snapshot that only includes metadata and depends on the true snapshot;
performing the data recovery according to the snapshot type, to generate recovered data;
after the data recovery is completed, generating a new false snapshot by:
generating a path pointing to immediately preceding true snapshot data stored prior to the data recovery, based on a path included in the retrieved metadata;
determining a time period from a snapshot generation timestamp included in the retrieved metadata and a time point at which the recovered data was recovered, acquiring an operation sequence of write operations performed during the time period, and forming a water range corresponding to the time period, the water range being based on the operation sequence;
generating a snapshot generation timestamp corresponding to the time point at which the recovered data was recovered;

storing the new false snapshot comprising false snapshot metadata including the generated snapshot generation timestamp, the generated path and the formed water range; and performing a backup subsequent to storing the new false snapshot, the backup referencing to the new false snapshot.

16. The non-transitory computer readable storage medium according to claim 15, wherein the request comprises a requested snapshot of a plurality of stored snapshots, and the metadata of the requested snapshot is retrieved.

17. The non-transitory computer readable storage medium according to claim 15, wherein the request comprises a time point, and the retrieving the metadata comprises:

retrieving the snapshot generation timestamp from metadata of each of a plurality of stored snapshots;

determining a closest snapshot generation timestamp that is closest in time to the time point and that is before the time point, and determining metadata corresponding to the closest snapshot generation timestamp.

18. The non-transitory computer readable storage medium according to claim 15, wherein:

when the snapshot type is the true snapshot type, the recovered data is directly acquired from a path included in the retrieved metadata, and when the snapshot type is the false snapshot type, initial true snapshot data is acquired from the path included in the retrieved metadata, and the recovered data is generated by replaying, on the initial true snapshot data, the operation sequence indicated by range information in the retrieved metadata.

19. The non-transitory computer readable storage medium according to claim 18, wherein replaying the operation sequence comprises:

determining a range to be replayed according to the range information included in the retrieved metadata; and executing an operation sequence of operations indicated by the range on the initial true snapshot data to generate the recovered data to a final time point indicated by the range.

* * * * *